(12) United States Patent
Haas

(10) Patent No.: US 7,191,847 B2
(45) Date of Patent: Mar. 20, 2007

(54) DRIVE FOR A MOTOR-DRIVEN HAND-HELD TOOL

(75) Inventor: Guenter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 11/006,311

(22) Filed: Dec. 7, 2004

(65) Prior Publication Data

US 2005/0126018 A1 Jun. 16, 2005

(30) Foreign Application Priority Data

Dec. 11, 2003 (DE) ................................ 103 58 033

(51) Int. Cl.
*B25D 11/12* (2006.01)
(52) U.S. Cl. ................ 173/114; 173/49; 173/216; 30/394
(58) Field of Classification Search .............. 173/213, 173/216, 49, 114; 123/192.1, 192.2; 30/392, 30/394
See application file for complete search history.

(56) References Cited

U.S. PATENT DOCUMENTS

| 3,921,729 | A | * | 11/1975 | Schmuck ..................... 173/14 |
| 4,462,467 | A | * | 7/1984 | Weingartner ................ 173/105 |
| 5,079,844 | A | * | 1/1992 | Palm ............................ 30/392 |
| 5,598,636 | A | * | 2/1997 | Stolzer ......................... 30/394 |
| 5,868,208 | A | * | 2/1999 | Peisert et al. ................ 173/178 |
| 6,520,266 | B2 | * | 2/2003 | Bongers-Ambrosius et al. ............................. 173/2 |
| 6,557,648 | B2 | * | 5/2003 | Ichijyou et al. ............... 173/48 |
| 6,742,267 | B2 | * | 6/2004 | Marinkovich et al. ......... 30/394 |
| 6,772,662 | B2 | * | 8/2004 | Marinkovich et al. ......... 83/34 |
| 6,810,589 | B2 | * | 11/2004 | Lagaly et al. ................. 30/392 |
| 6,902,012 | B2 | * | 6/2005 | Kristen et al. .............. 173/200 |
| 6,907,543 | B2 | * | 6/2005 | Hino et al. .................... 714/4 |
| 2002/0056558 | A1 | * | 5/2002 | Bongers-Ambrosius et al. ........................... 173/201 |
| 2002/0088627 | A1 | * | 7/2002 | Plietsch ..................... 173/201 |
| 2004/0222001 | A1 | * | 11/2004 | Ikuta et al. ................. 173/210 |

* cited by examiner

*Primary Examiner*—Louis K. Huynh
*Assistant Examiner*—Gloria R. Weeks
(74) *Attorney, Agent, or Firm*—Abelman, Frayne & Schwab

(57) ABSTRACT

A drive for a motor-driven hand-held tool includes a motor (17) and a gear mechanism (20) for converting a rotational movement of the motor (17) into a reciprocating movement of the reciprocating drive element (30) for a working tool, with the gear mechanism (20) having a transmission element (23) axially secured on a support (21) with a support member (26) and including a mass-balance member (31), a first eccentric take-off element (24) cooperating with the reciprocating drive element (30) and a second eccentric take-off element (25) cooperating with the mass-balance member (31) for imparting reciprocating movement thereto, and with the support member (26) forming a slide support surface for the mass-balance member (31).

7 Claims, 3 Drawing Sheets

DRIVE FOR A MOTOR-DRIVEN HAND-HELD TOOL

BACKGROUND OF THE INVENTION

1. Field of the Invention

The present invention relates to a drive for a motor-driven hand-held tool having a reciprocating drive element for driving a working tool, with the drive including a motor and a gear mechanism for converting a rotational movement of the motor into a reciprocating movement of the reciprocating drive element and having a transmission element axially secured on a support with a support member and including an eccentric take-off element cooperating with the reciprocating drive element for imparting the reciprocating movement thereto.

2. Description of the Prior Art

Drives of the type described above are used, e.g., in saber or compass saws in which the drive imparts reciprocating movement to a saw blade.

In motor-driven hand-held tools with a reciprocating movement of the working tool, for compensation of unbalance, a balance mass is driven, together with the tool-securing means, and in direction opposite the driving line. The balance mass should be displaced substantially linear, and a reliable axial support for the gear mechanism, should be provided.

German Publication DE 68921294, from which the present invention proceeds, discloses a drive for a motor-driven tool in which the driving element or the transmission element of a gear mechanism is axially supported against a housing by a securing plate with a support ring located therebetween.

The drawback of a known drive consists in that the unbalance compensation is not contemplated.

Accordingly, an object of the present invention is to provide a drive of a type described above with an adequate compensation of unbalance.

Another object of the invention is to provide a drive with an adequate compensation of unbalance and which can be economically produced and in which support of the transmission element of the gear mechanism is possible with little costs of the necessary components.

SUMMARY OF THE INVENTION

These and other objects of the present invention, which will become apparent hereinafter, are achieved by providing a transmission element having a mass-balance member, and a second eccentric take-off element cooperating with the mass-balance member for imparting reciprocating movement thereto, with the support member forming a slide support surface for the mass-balance member. With provision of a transmission element having a mass-balance member and a second take-off eccentric element which cooperates with the mass-balance member, there is provided a drive that in addition to means for reciprocatingly driving a working tool, includes means for reciprocatingly driving a balance mass. The support member serves simultaneously for securing the transmission element, e.g., a conical gear, and for slidingly supporting the balance mass. Thus, with few components, an economical drive is provided for a compatible motor-driven hand-held tool.

Advantageously, the support member is formed of two parts, with the sliding support surface being provided on at least one of the parts. Such a support member, e.g., a support metal sheet can be easily mounted, e.g., after the transmission element has been inserted in a support receptacle of the support.

Advantageously, the support member is formed as a sheet metal section, which permits to cost-effectively produce the support member. A high stability of the support is insured when the support member is secured to the support with appropriate connection means such as screw means, rivet, and the like.

According to an advantageous embodiment of the present invention, a support receptacle is provided in the support for receiving a base member of the transmission element. During assembly, the base member can be inserted into receptacle, which generally improves the support of the transmission member.

It is further advantageous when the upper rim of the base member is flush aligned with the adjacent surface of the support. In this case, the support member can lie on both parts, and a too large backlash of the transmission element is prevent in a mounted condition of the transmission element on the support.

Advantageously, the inventive drive is mounted on the hand-held tool.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
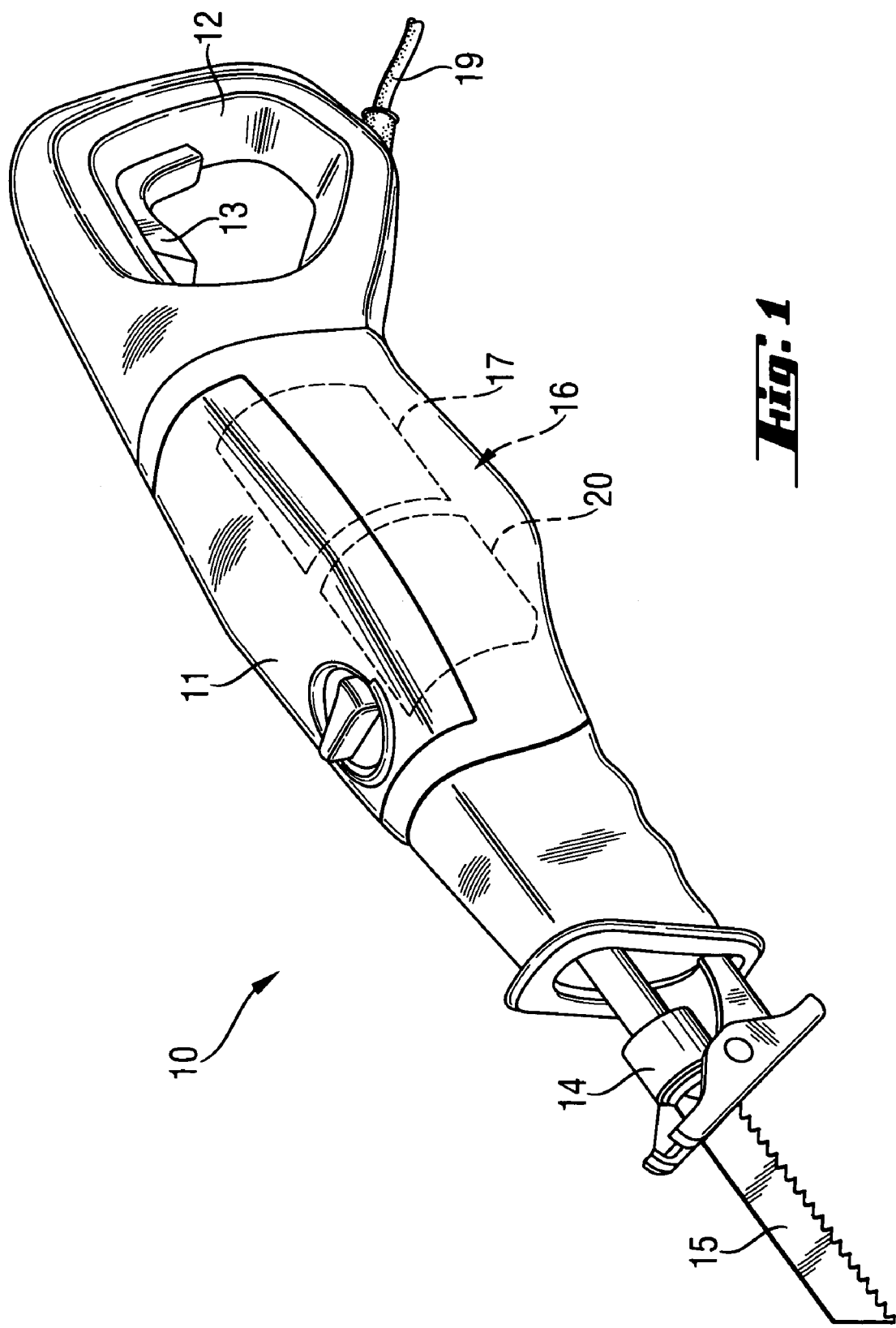
FIG. 1 a perspective view of a motor-driven hand-held tool with a motor drive according to the present invention.

FIG. 1 shows a motor-driven hand-held tool 10 in form of a saber saw with a drive 16 according to the present invention which is arranged in a multi-part housing 11. The drive 16 includes a motor 17, e.g., an electric motor, and a gear mechanism 20 that converts a rotational movement of the motor 17 in a reciprocating movement. The current supply of the hand-held tool 10 is effected via a network connector 19 in form of a network cable connectable with a power source. Naturally, for current supply, the hand-held tool 10 can be provided with an accumulator, a battery pack, and the like.

The hand-held tool 10 further has a handle 12 on which an actuation switch 13 is arranged for actuating the hand-held tool 10. At the end of the hand-held 10 opposite the handle 12, there is provided means for securing a working tool in form of a working tool clamp 14 in which a tool 15, e.g., a saw blade is secured. The clamp 14 is secured at a free end of reciprocating drive means 30, such as, e.g., a pushrod that is arranged lies in the driven line of the gear mechanism 20, as shown in FIG. 2.

Figure 2:
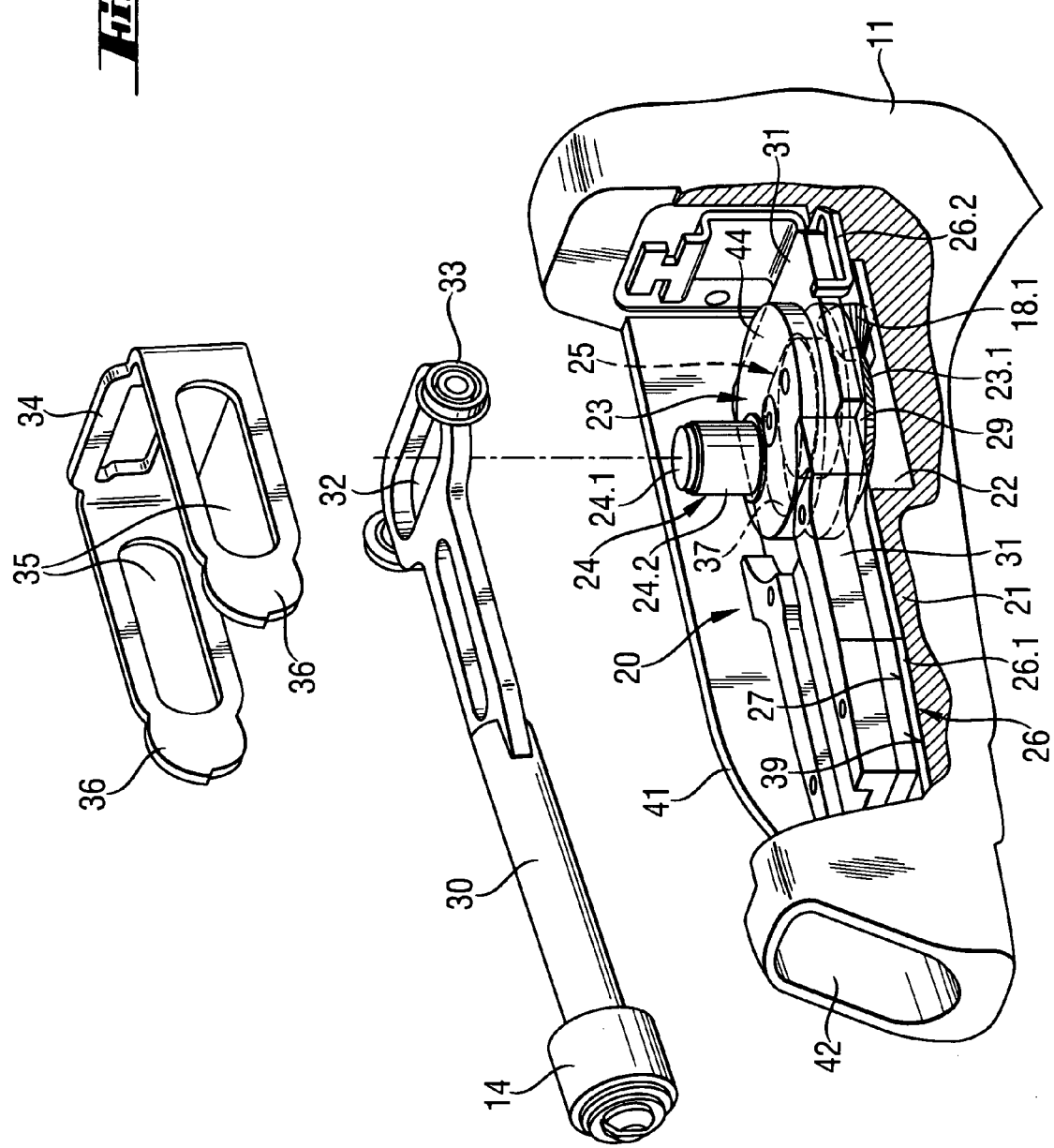
FIG. 2 an exploded view of the drive of the hand-held tool shown in FIG. 1.
Figure 3:
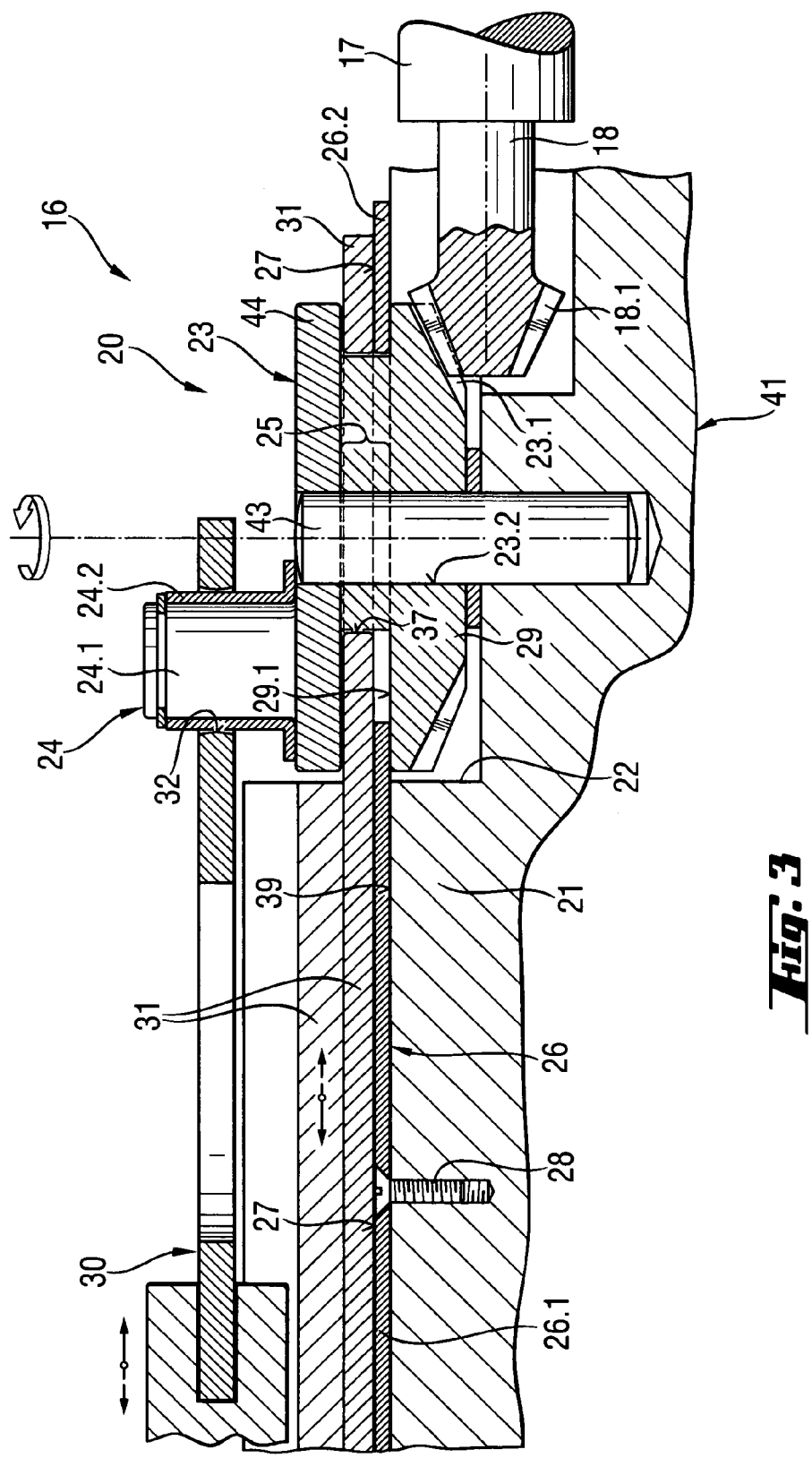
FIG. 3 a longitudinal cross-sectional view of a section of the tool drive.

FIGS. 2 and 3 show a housing part 41 that forms a support 21 for the gear mechanism 20 of the drive 16. In the housing part 41 or in the support 21, there is provided a flat cylindrical, support receptacle 22 for receiving an annular disc-shaped base member 29 of a transmission element 23 such as, e.g., a conical gear of the gear mechanism 20. At its side, which is located in the support receptacle 22, the base member 29 has a slanted rim and is provided with a toothing 23.1 engageable with a toothing 18.1 of a driven element 18 connected with the motor 17. The transmission element 23, which is arranged in the support receptacle 22, has an opening 23.2 with which it is rotatably supported on a support member 43 formed as a pin or a threaded member. Above the base member 29, two eccentric take-off elements 24 and 25 are arranged on the transmission element 23. The eccentric take-off element 25 is formed by an eccentrically arranged on the transmission element, annular disc section the diameter of which is smaller than that of the base member 29. The second take-off element 24 is formed as a pin 24.1 which is eccentrically arranged on the transmission element 23. A sleeve member 24.2 is rotatably mounted on the pin 24.1. The upper rim 29.1 of the base member 29 is flush aligned with the surface 39 of the support 21 which is adjacent to the support receptacle 21. A support member 26, which is formed substantially of a flat sheet metal section, is arranged on the surface 39 and is secured to the support 21 with connection means 28, such as, e.g., a screw. For easy mounting, the support member 26 is formed, in the embodiment shown in the drawings, of two parts 26.1 and 26.2. The support member 26 secures the transmission element 23 in the axial direction by partially overlapping the base member 29 in the region of the upper rim 29.1 of the base member 29. The support member 26 has, at its side remote from the support 21, a slide support surface 27 on which a mass-balance member 31 is displaceably supported. The mass-balance member 31 has a recess 37 that surrounds the eccentric take-off element 25 of the transmission element 23 and thereby is reciprocated by the transmission element 23 upon its rotation. The mass-balance member 31 serves as a counterweight to the reciprocating drive means 30 and the working tool 15 secured thereon. The mass-balance member 31 is displaceable in the direction opposite to the displacement direction of the drive means 30.

In order to axially secure the mass-balance member 31, it is partially overlapped by a section 44 of the transmission element 23 that lies above the eccentric take-off element 25.

The reciprocating drive means 30, which is formed as a pushrod, which was discussed previously, has a recess 32 that is formed as an elongate hole that surrounds, in an assembled condition of the drive, the pin 24.1, together with the sleeve 24.2, of the eccentric take-off element 24. Thus, the rotational movement of the transmission element 23 leads to the reciprocating movement of the drive means 30. The reciprocating drive means 30 is guided in guide recesses 35 of a guide member 34 with guide rollers 33 arranged sidewise of the recess 32. The inclination of the guide member 34 in the hand-held tool 10 is adjustable. The guide member 34 can be inclined about the hinge extensions 36. By adjusting the inclination of the guide member 34, the inclination of the drive means 30, which is guided in guide recesses 36, is adjusted. The reciprocating drive means 30 projects from the housing 11 of the hand-held tool 10 through the opening 42.

Though the present invention was shown and described with references to the preferred embodiment, such is merely illustrative of the present invention and are not to be construed as a limitation thereof and various modifications of the present invention will be apparent to those skilled in the art. It is therefor not intended that the present invention be limited to the disclosed embodiment or details thereof, and the present invention includes all variations and/or alternative embodiments within the spirit and scope of the present invention as defined by the appended claims.

What is claimed is:

1. A drive for a motor-driven hand-held tool (10) having reciprocating drive means (30) for a driving a working tool (15), the drive comprising a motor (17); and a gear mechanism (20) for converting a rotational movement of the motor (17) into a reciprocating movement of the reciprocating drive means (30), the gear mechanism (20) having a transmission element (23) axially secured on a support (21) with a support member (26) and including a first eccentric take-off element (24) cooperating with the reciprocating drive means (30) for imparting the reciprocating movement thereto, a mass-balance member (31) guiding the reciprocating drive means (30) in said reciprocating movement, and a second eccentric take-off element (25) cooperating with the mass-balance member (31) for imparting reciprocating movement thereto, the support member (26) forming a slide support surface for the mass-balance member (31).

2. A drive according to claim 1, wherein the support member (26) is formed of two parts (26.1, 26.2), and wherein the slide support surface (27) is formed on at least one of the two parts (26.1, 26.2).

3. A drive according to claim 1, wherein the support member (26) is formed of a sheet metal section.

4. A drive according to claim 1, wherein the support member (26) is secured to the support (21) with connection means (28).

5. A drive according to claim 1, wherein the transmission element (23) has a base member (29), and the support (21) has a support receptacle (22) for the base member (29).

6. A drive according to claim 5, wherein an upper rim (29.1) of the base member (29) is flush aligned with an adjacent surface (39) of the support (21).

7. A motor-driven hand-held tool (10) comprising reciprocating drive means (30) for driving a working tool (15); and a drive including a motor (17) and a gear mechanism (20) for converting a rotational movement of the motor (17) into a reciprocating movement of the reciprocating drive means (30), the gear mechanism (20) having a transmission element (23) axially secured on a support (21) with a support member (26) and including a first eccentric take-off element (24) cooperating with the reciprocating drive means (30) for imparting the reciprocating movement thereto, a mass-balance member (31) guiding the reciprocating drive means (30) in said reciprocating movement, and a second eccentric take-off element (25) cooperating with the mass-balance member (31) for impact reciprocating movement thereto, the support member (26) forming a slider support surface for the mass-balance member (31).

* * * * *